United States Patent
Cheng et al.

(10) Patent No.: US 11,373,606 B2
(45) Date of Patent: Jun. 28, 2022

(54) INK SCREEN READING DEVICE, SCREEN DRIVING METHOD THEREOF AND STORAGE MEDIUM

(71) Applicants: ZHANGYUE TECHNOLOGY CO., LTD, Beijing (CN); SHENZHEN ZHANGYUE TECHNOLOGY CO., LTD, Shenzhen (CN)

(72) Inventors: Chao Cheng, Beijing (CN); Wenzhi Zhu, Beijing (CN)

(73) Assignees: ZHANGYUE TECHNOLOGY CO., LTD, Beijing (CN); SHENZHEN ZHANGYUE TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/296,128

(22) PCT Filed: Nov. 15, 2019

(86) PCT No.: PCT/CN2019/118915
§ 371 (c)(1),
(2) Date: May 21, 2021

(87) PCT Pub. No.: WO2020/173147
PCT Pub. Date: Sep. 3, 2020

(65) Prior Publication Data
US 2021/0312873 A1    Oct. 7, 2021

(30) Foreign Application Priority Data
Feb. 26, 2019    (CN) .......................... 201910142609.5

(51) Int. Cl.
*G09G 3/34*    (2006.01)
*G02F 1/167*    (2019.01)

(52) U.S. Cl.
CPC ............. *G09G 3/344* (2013.01); *G02F 1/167* (2013.01); *G09G 2310/027* (2013.01); *G09G 2320/041* (2013.01)

(58) Field of Classification Search
None
See application file for complete search history.

(56) References Cited

U.S. PATENT DOCUMENTS

2009/0256868 A1    10/2009    Low et al.
2010/0171752 A1    7/2010    Kim et al.
(Continued)

FOREIGN PATENT DOCUMENTS

CN    1849644 A    10/2006
CN    101388179 A    3/2009
(Continued)

OTHER PUBLICATIONS

International Patent Application No. PCT/CN2019/118915; Int'l Search Report; dated Feb. 7, 2020; 2 pages.

*Primary Examiner* — Matthew Yeung
(74) *Attorney, Agent, or Firm* — BakerHostetler (57) ABSTRACT

The disclosure relates to an ink screen reading device, a screen driving method thereof and a storage medium. The method comprises: acquiring a current temperature value of a screen; judging whether the current temperature value is lower than a preset first temperature value; in condition that the current temperature value is lower than the first temperature value, choosing a second temperature value and looking up a preset table according to the second temperature value and grayscale values of content to be displayed to obtain a waveform of the screen; in condition that the current temperature value is higher than or equal to the first temperature value, looking up the table according to the current temperature value and the grayscale values of content to be
(Continued)

displayed to obtain the waveform of the screen; and driving the screen by the waveform to display the content to be displayed.

18 Claims, 7 Drawing Sheets

(56) References Cited

U.S. PATENT DOCUMENTS

2017/0124959 A1\* 5/2017 Kim ................... G09G 3/3225
2018/0259824 A1\* 9/2018 Bouchard ............ G09G 3/2048

FOREIGN PATENT DOCUMENTS

| CN | 102411902 A | 4/2012 |
| CN | 105895032 A | 8/2016 |
| CN | 108604435 A | 9/2018 |
| CN | 109213224 A | 1/2019 |
| CN | 109697961 A | 4/2019 |
| JP | 5257181 B2 | 8/2013 |
| JP | 2015-184514 A | 10/2015 |

\* cited by examiner

INK SCREEN READING DEVICE, SCREEN DRIVING METHOD THEREOF AND STORAGE MEDIUM

CROSS REFERENCE TO RELATED APPLICATION

This application is the National Stage of International Patent Application No. PCT/CN2019/118915, filed Nov. 15, 2019, which claims priority to Chinese Patent Application NO. 201910142609.5, titled "INK SCREEN READING DEVICE, SCREEN DRIVING METHOD THEREOF AND STORAGE MEDIUM", filed Feb. 26, 2019, the entire contents of which are incorporated herein by reference.

TECHNICAL FIELD

The disclosure relates to the technical field of computer, and particularly to an ink screen reading device, a screen driving method thereof and a storage medium.

BACKGROUND

Ink screen devices refer to electronic devices that use an electronic ink screen (e-ink screen). Some ink screen devices have a handwriting function, and are also called handwriting reading devices or handwriting readers. The e-ink screen is a screen that does not emit light by itself but relies on external reflection to achieve a display effect. As the display effect of the e-ink screen is very similar to that of paper materials, the experience of reading the e-ink screen is comparable to that of reading the paper materials.

The ink screen is composed of many microcapsules, and each microcapsule contains multiple black particles and multiple white particles which have opposite charges. When black content needs to be displayed on the screen, the black particles are driven by a voltage to move up to the top of the screen (that is, to move from the bottom to the screen), when white content needs to be displayed, the white particles are driven by the voltage to move up to the top of the screen (that is, to move from the bottom to the screen). In addition, the existing e-readers also provide 16 grayscale colors, that is, 16 grayscale colors from white to black (light gray, dark gray, etc.). The black particles are controlled by the voltage to move up to different positions, so as to realize corresponding grayscale display.

Generally, it is necessary for ink screen providers to provide a display look-up-table (LUT). The LUT is a voltage drive table in which a correspondence between different grayscales and drive waveforms is recorded. The drive waveform is mainly composed of a waveform amplitude (corresponding to the size of the drive voltage), a pulse width, and the number of pulses. In principle, the longer the distance the particles are driven to move, the greater the required driving voltage, the greater the pulse width, and the greater the number of pulses. For example, when black content is to be displayed, the black particles move the longest distance (from the bottom to the top of the screen); when dark gray content is to be displayed, the black particles move a longer distance that is shorter than the longest distance, and when light gray content is to be displayed, the black particles move a distance shorter than the longer distance.

Material properties of the ink screen itself will make particles to produce higher "viscosity" in low temperature environments, which causes movement distances of the particles are insufficient. For example, when the same driving waveform is used to drive the movement of the black particles, the distance between the black particles and the top of the screen after the black particles moving in a low temperature environment is greater than that in a high temperature environment, resulting in the displayed grayscales become lighter. In order to overcome this defect, in the prior art, when looking up the LUT, it is not only necessary to refer to the grayscales of the displayed content, but also to refer to the current temperature of the ink screen. In principle, when the same grayscale content is to be displayed, the lower the temperature, the greater the driving voltage of the driving waveform, the greater the waveform width, and the greater the number of pulses, which can make the particles fully move to the corresponding position, that is, the movement of the particles in low temperature environments needs to be compensated.

The inventor found that there are at least the following defects in the prior art: since the driving voltage has a certain value range and its effect on particle movement compensation is relatively limited, the movement compensation in low temperature environments is mainly achieved by increasing the pulse width and the number of pulses, which will increase the time-consuming of screen refresh; and compared with Liquid Crystal Display (LCD) screens, the ink screen itself has the characteristic of low refresh speed, and further reducing the refresh speed in low temperature environments will seriously impact the use experience of users.

SUMMARY

In view of this, an ink screen reading device, a screen driving method thereof and a storage medium are provided according to the embodiments of the disclosure, to at least partially solve the problems in the prior art.

In an aspect, a screen driving method of an ink screen reading device is provided. The screen driving method comprises:

acquiring a current temperature value of a screen;

judging whether the current temperature value is lower than a preset first temperature value;

in condition that the current temperature value is lower than the first temperature value, choosing a second temperature value and looking up a preset table according to the second temperature value and grayscale values of content to be displayed to obtain a waveform of the screen, wherein the second temperature value is higher than or equal to the first temperature value;

in condition that the current temperature value is higher than or equal to the first temperature value, looking up the table according to the current temperature value and the grayscale values of content to be displayed to obtain the waveform of the screen; and driving the screen by the waveform to display the content to be displayed.

In another aspect, an ink screen reading device is provided. The ink screen reading device comprises: a screen, a temperature sensor, at least one processor, a memory, a communication interface and a communication bus, wherein the screen, the temperature sensor, the processor, the memory, and the communication interface communicate with each other through the communication bus;

the memory is configured to store executable instructions that upon execution cause the at least one processor to perform operations, the operations comprising:

acquiring a current temperature value of the screen via the temperature sensor;

judging whether the current temperature value is lower than a preset first temperature value;

in condition that the current temperature value is lower than the first temperature value, choosing a second temperature value and looking up a preset table according to the second temperature value and grayscale values of content to be displayed to obtain a waveform of the screen, wherein the second temperature value is higher than or equal to the first temperature value;

in condition that the current temperature value is higher than or equal to the first temperature value, looking up the table according to the current temperature value and the grayscale values of content to be displayed to obtain the waveform of the screen; and driving the screen by the waveform to display the content to be displayed.

In further aspect, a non-volatile computer readable storage medium is provided. The non-volatile computer readable storage medium stores at least one executable instruction, wherein the executable instruction is configured to cause a processor to perform the following operations:

acquiring a current temperature value of a screen;

judging whether the current temperature value is lower than a preset first temperature value;

in condition that the current temperature value is lower than the first temperature value, choosing a second temperature value and looking up a preset table according to the second temperature value and grayscale values of content to be displayed to obtain a waveform of the screen, wherein the second temperature value is higher than or equal to the first temperature value;

in condition that the current temperature value is higher than or equal to the first temperature value, looking up the table according to the current temperature value and the grayscale values of content to be displayed to obtain the waveform of the screen; and driving the screen by the waveform to display the content to be displayed.

In further aspect, a computer program product is provided. The computer program product comprising a computing program stored on the non-volatile computer readable storage medium described above.

the screen driving method for the ink screen reading device according to an embodiment of the present disclosure compare the current temperature of the screen with the preset first temperature value, and when the current temperature of the screen is lower, a higher second temperature value is used to look up the preset table to obtain a waveform of the screen. Since the second temperature value is higher than the current temperature, a driving waveform with a shorter refresh time can be obtained, thereby improving the refresh speed The summary of the technical solutions of the present disclosure is described above. The technical means of the present disclosure may be understood clearer according to content of the specification. In order to make the above and other objects, features and advantages of the present disclosure clearer and easier to be understood, specific embodiments of the present disclosure are described hereinafter.

BRIEF DESCRIPTION OF THE DRAWINGS

According to the detailed description of preferred embodiments of the present disclosure, various other advantages and benefits become clear for those skilled in the art. Drawings are only used to illustrate the preferred embodiments rather than limit the present disclosure. Throughout the drawings, the same components are represented by the same reference numeral. In the drawings.

DETAILED DESCRIPTION

Schematic embodiments of the present disclosure are described in detail with reference to the drawings hereinafter. Although the drawings show the schematic embodiments of the present disclosure, it should be understood that the present disclosure may be implemented by various embodiments and is not limited by embodiments clarified herein. Practically, the embodiments are described herein so that the present disclosure can be understood thoroughly and the scope of the present disclosure can be completely conveyed to those skilled in the art.

Figure 1:
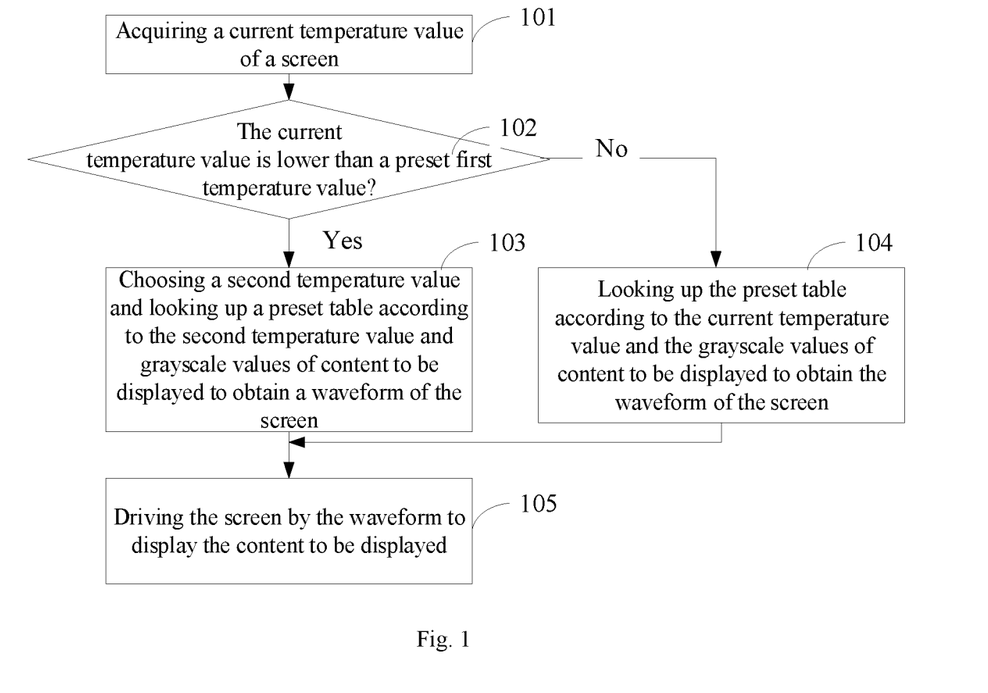
FIG. 1 is a schematic flowchart showing a screen driving method for an ink screen reading device according to an embodiment of the present disclosure.

FIG. 1 is a schematic flowchart showing a screen driving method for an ink screen reading device according to an embodiment of the present disclosure. The method is applicable to an ink screen reading device. As shown in FIG. 1, the method includes the steps in the following.

Step 101, acquiring a current temperature value of a screen

The current temperature of the screen can be detected by the temperature detection unit in the ink screen reading device such as a temperature sensor, and then the detected current temperature of the screen can be acquired. This temperature is mainly affected by the temperature of the outside environment. The screen of the ink screen reading device is generally an ink screen, and the following embodiments of the present disclosure all take the ink screen as an example for description.

Step 102, judging whether the current temperature value is lower than a preset first temperature value, if yes, performing Step 103, otherwise, performing Step 104

Step 103, choosing a second temperature value and looking up a preset table according to the second temperature value and grayseale values of content to be displayed to obtain a waveform of the screen The second temperature value is a preset value and greater than or equal to the first temperature value. The first temperature value and the second temperature value may be fixed values set artificially. Generally, the first temperature value is set to a appropriate display temperature of the ink screen, for example, between 24-70 degrees, or between 30-70 degrees. The second temperature value is set as the first temperature value increased by a certain number of degrees, for example, the second temperature value is set as the first temperature value plus 3 degrees. In one embodiment, the first temperature value is 24 degrees and the second temperature value is 27 degrees. In another embodiment, the first temperature value is 27 degrees, and the second temperature value is 30 degrees.

The preset table may be the LUT. The LUT is the correspondence table of temperatures, grayscale values and driving waveforms. Generally speaking, in the LUT table, when the same grayscale value is displayed, the lower the temperature, the greater the driving voltage of the driving waveform, the greater the waveform width, the greater the number of pulses, and the slower the refresh rate.

In condition that the current temperature is lower than the preset first temperature value, if the preset table is looked up according to the current temperature, because the temperature is lower, the refresh speed will be slower. Thus a second temperature value higher than or equal to the first temperature value is chosen and the table is looked up according to the second temperature value to obtain the waveform of the screen. In this way, since the current temperature is lower than the first temperature value and the second temperature value is higher than or equal to the first temperature value, the second temperature value is higher than the current temperature. Using the temperature value higher than the current temperature to look up the table can get a driving waveform with a shorter refresh time, thereby improving the refresh speed.

Step 104, looking up the table according to the current temperature value and the grayscale values of content to be displayed to obtain the waveform of the screen In condition that the current temperature value is higher than or equal to the first temperature value, it is indicated that the current temperature is suitable for the display of the ink screen and using the current temperature to look up the table will not cause the refresh speed to be slower, thus the driving waveform is still obtained by looking up the table according to the current temperature.

Step 105, driving the screen by the waveform to display the content to be displayed The embodiment of the present disclosure compares the current temperature value of the screen with a preset first temperature value, in condition that the current temperature of the screen is lower, a higher second temperature value is used to obtain the waveform of the screen by looking up the table, and because the second temperature value is higher than the current temperature, a driving waveform with a shorter refresh time can be obtained, thereby improving the refresh speed.

Figure 2:
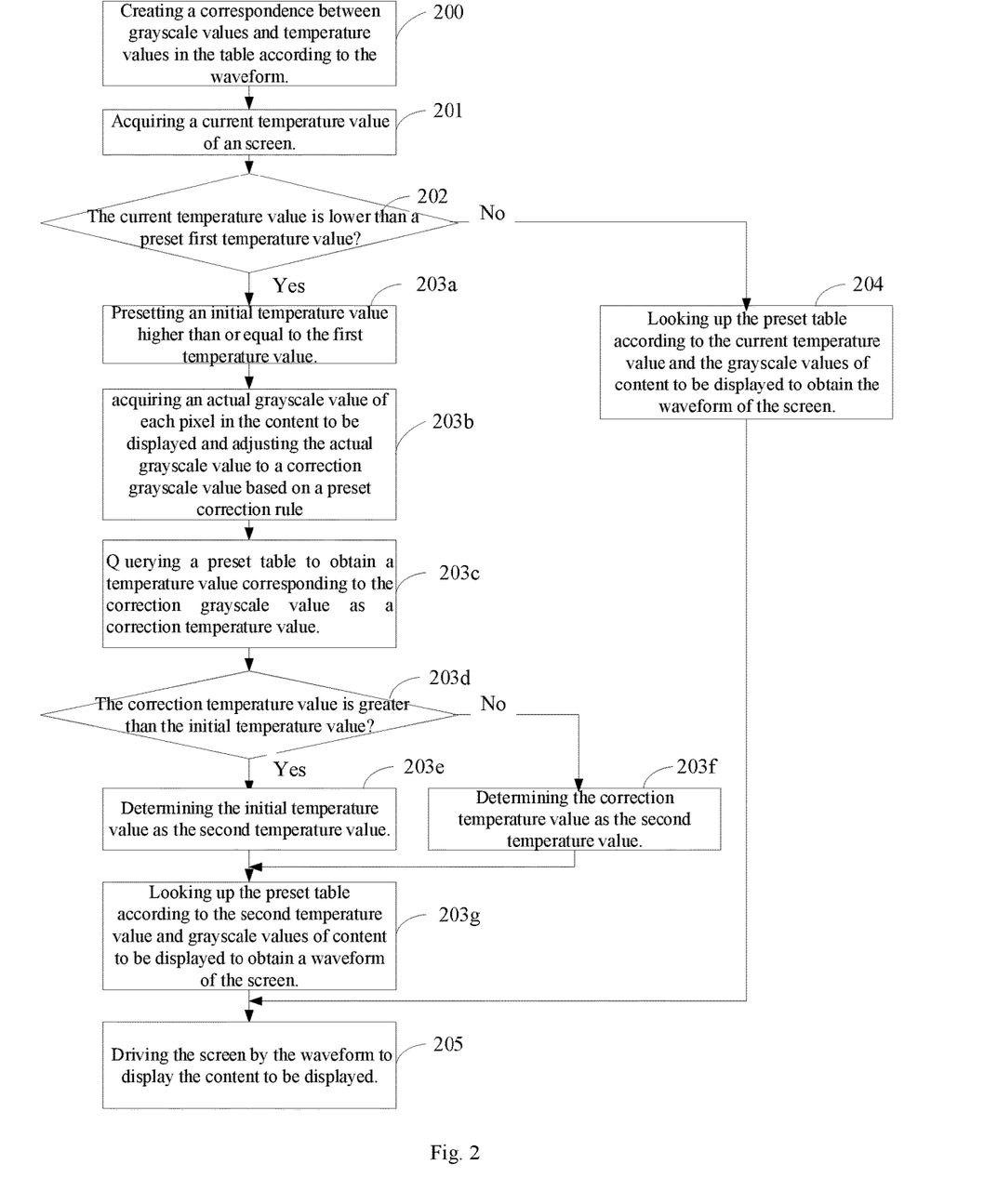
FIG. 2 is a schematic flowchart showing a screen driving method for an ink screen reading device according to another embodiment of the present disclosure.

Further, in order to avoid the display grayscale to be too light caused by the improved refresh speed, FIG. 2 is a schematic flowchart showing a screen driving method for an ink screen reading device according to another embodiment of the present disclosure, and the method is applied to the ink screen reading device. As shown in FIG. 2, the method includes the steps in the following.

Step 200, creating a correspondence between grayscale values and temperature values in the table according to the waveform The creation of the correspondence can be done in the following ways:

First, the correspondence between each grayscale value and the driving waveforms is determined by looking up the table; then, the correspondence between each grayscale value and temperature values is created in the table according to the waveform.

Step 201, acquiring a current temperature value of an screen

Step 202, judging whether the current temperature value is lower than a preset first temperature value, if yes, performing Step 203*a*, otherwise, performing Step 204

Step 203*a*, presetting an initial temperature value higher than or equal to the first temperature value The initial temperature value is a preset value and higher than or equal to the first temperature value. The first temperature value and the initial temperature value may be fixed values set artificially. Generally, the first temperature value is set to the appropriate display temperature of the ink screen, for example, between 24-70 degrees, or between 30-70 degrees. The initial temperature value is set as the first temperature value increased by a certain number of degrees, and for example, the initial temperature value is set as the first temperature value plus 3 degrees. In one embodiment, the first temperature value is 24 degrees and the initial temperature value is 27 degrees. In another embodiment, the first temperature value is 27 degrees, and the initial temperature value is 30 degrees.

Step 203*b*, acquiring an actual grayscale value of each pixel in the content to be displayed and adjusting the actual grayscale value to a correction grayscale value based on a preset correction rule The correction grayscale value is less than the actual grayscale value. Adjusting the actual grayscale value to a correction grayscale value based on a preset correction rule may be adjusting the actual grayscale value to the correction grayscale value based on a grayscale loss ratio. The grayscale loss ratio is set according to the actual situation, and the higher the ratio, the higher the grayscale restoration degree, but the lower the refresh speed. The lower the ratio, the worse the grayscale restoration, but the faster the refresh speed. As long as the grayscale loss ratio is not set to 100%, the refresh speed will be improved. However, in actual use, in order to ensure the user's visual experience, the ratio is generally not set too low. Through this scheme, it aims to find a balance point between the grayscale restoration degree and the refresh speed. For example, the grayscale loss ratio can be set to 64%, that is, the display grayscale should not be lower than 64% of the original grayscale, when refreshing, the grayscale value of each pixel is read out from the data information of the content to be displayed, and the grayscale value is multiplied by 64% to obtain the correction grayscale value.

Adjusting the actual grayscale value to a correction grayscale value based on a preset correction rule may also be reducing a grayscale of the content to be displayed by N grayscales to obtain the correction grayscale value, where N is a natural number. In the handwriting scene, the user may choose different line thicknesses. Since thinner lines are more sensitive to grayscale loss, the grayscale loss ratio corresponding to different line thickness parameters can be established. Generally, the thinner the line, the bigger the gray loss ratio can be set, for example, the gray loss ratio is set to be inversely proportional to the thickness of the stylus line. For example, for the ink screen reading device using discrete grayscale values such as 16-level grayscale and 8-level grayscale, the grayscale of the content to be displayed may be directly reduced by one to two grayscales to obtain the correction grayscale value. The higher the gray scale, the smaller the improvement effect brought by the reduction. Therefore, for the grayscale that is too high, it is more suitable to adjust the actual grayscale value to the correction grayscale value based on the grayscale loss ratio.

Step 203c, querying a preset table to obtain a temperature value corresponding to the correction grayscale value as a correction temperature value Step 203d, judging whether the correction temperature value is greater than the initial temperature value, if yes, performing Step 203e, otherwise, performing Step 203f Step 203e, determining the initial temperature value as the second temperature value Step 203f, determining the correction temperature value as the second temperature value The essential idea of the above steps 203d-203f is that if the initial temperature value is higher than the correction temperature value, the correction temperature value is used; if the initial temperature value is not higher than the correction temperature value, the initial temperature value is used. In this way, it can avoid looking up the table by using a higher temperature which causes refresh rate is too high and grayscale display is too light.

Step 203g, looking up the table according to the second temperature value and grayscale values of content to be displayed to obtain a waveform of the screen, Step 204, looking up the table according to the current temperature value and the grayscale values of content to be displayed to obtain the waveform of the screen Step 205, driving the screen by the waveform to display the content to be displayed This embodiment first determines an initial temperature value that is equivalent to the second temperature value of the previous embodiment, reduces the grayscale value to an acceptable value, and then querying a preset table to obtain a temperature value corresponding to the correction grayscale value as a correction temperature value. The correction temperature value is the temperature to ensure that the display grayscale is not too light. Generally, the temperature for looking up the table should not be higher than the correction temperature value, and if it is higher than the correction temperature value, the refresh speed will be too high and the display grayscale will be too light. Thus, if the initial temperature value is higher than the correction temperature value, the lower correction temperature value is used to look up the table; if the initial temperature value is not higher than the correction temperature value, the lower initial temperature value is used to look up the table. In this way, it can be avoided to look up the table by using a higher temperature which causes refresh rate is too high and grayscale display is too light.

In the process of handwriting, the grayscale refreshed according to the foregoing embodiment is lighter than the grayscale refreshed according to the actual temperature. Therefore, a time may be chosen when the user is not sensitive to time delay, to do a compensation refresh and refresh the grayscale to the standard grayscale. Since the user is not sensitive to the saving time when the note page is saved, a compensation refresh can be done at this time.

In the prior art, the page is generally not saved after refreshing. For example, the user draws a line with a stylus, and it will not be saved after being displayed. In some embodiments of the present disclosure, in a handwriting scenario, in addition to refreshing and displaying the handwritten content that is note content according to the above method, the content data parameters of each handwritten pixel may be further saved. When the current note page is saved, for example, when the current note page is saved according a received instruction that the user clicks a save control or when the current note page is saved automatically at the time of exiting the current note page, the current note page is refreshed globally according to the standard grayscale value of each saved pixel, to refresh each pixel to the standard grayscale value, thereby eliminating grayscale loss.

Figure 3:
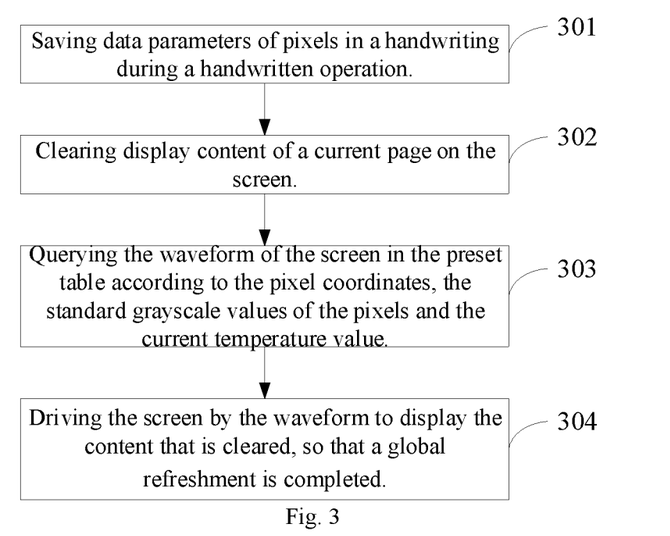
FIG. 3 is a schematic flowchart showing a screen driving method for an ink screen reading device according to further embodiment of the present disclosure.

FIG. 3 is a schematic flowchart showing a screen driving method for an ink screen reading device according to further embodiment of the present disclosure. The method is applicable to an ink screen reading device. As shown in FIG. 1, the method includes the steps in the following.

Step 301, saving data parameters of pixels in a handwriting during a handwritten operation The data parameters include pixel coordinates and standard grayscale values of pixels. In this step, the data parameters of each handwriting line drawn by the user in the current note page are saved. The standard grayscale value of the pixel is the grayscale value that the pixel should display. Because the actual refresh time is shortened, the actual grayscale value displayed is smaller than the standard grayscale value. Saving the pixel coordinates and the standard grayscale values of the pixels are for global refresh, that is, a global refresh of the entire page is performed again by using the standard grayscale value.

Step 302, in condition that the handwritten operation of the current page is completed, clearing display content of a current page on the screen When refresh is to be performed, the black and white particles are first returned to the initial positions by applying voltage to clear the content displayed on the current page.

Step 303, querying the waveform of the screen in the table according to the pixel coordinates, the standard grayscale values of the pixels and the current temperature value Step 304, driving the screen by the waveform to display the content that is cleared, so that a global refreshment is completed After refreshing, the refreshed page content is saved. The page content includes the book/notebook ID of the book/notebook, the page number of the page in the book or notebook, the coordinates of each pixel on the page, the corresponding grayscale value, and parameters of the inserted image such as link, location, size.

When there is an overlap between handwritten lines, the grayscale values of each handwritten line corresponding to the pixel of the overlap are superimposed as the standard grayscale value of the pixel. For example, for the ink screen reading device of 16-level gray, the superimposed grayscale value can be determined by adding the levels. If the number of adding the levels exceeds 16, the 16-level grayscale is used as the standard grayscale value (i.e. black).

This embodiment chooses the time when the user is not very sensitive to the time delay, to refresh the grayscale into the standard grayscale, thereby realizing the compensation refresh.

Figure 4:
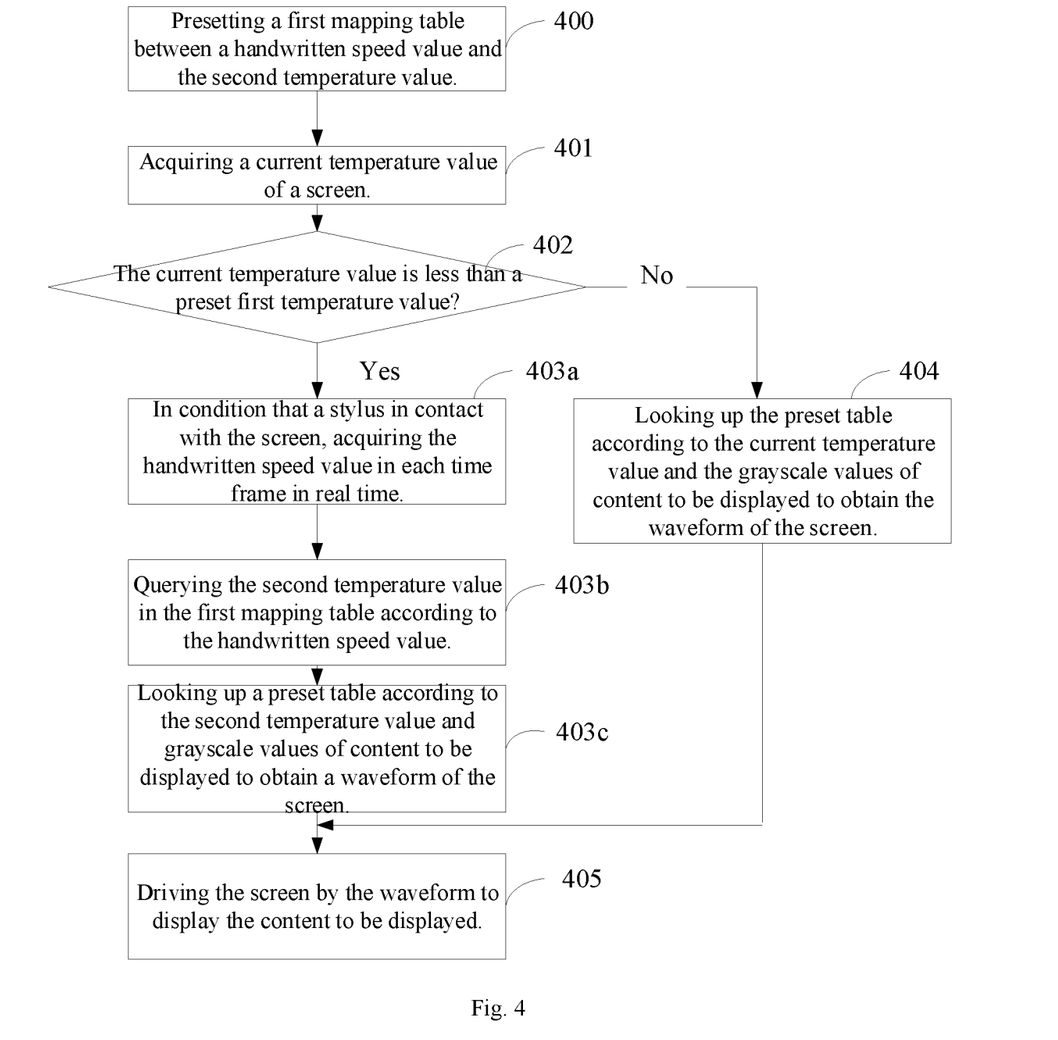
FIG. 4 is a schematic flowchart showing a screen driving method for an ink screen reading device according to further embodiment of the present disclosure.

In some embodiments, during the handwriting process, the second temperature value may also be dynamically adjusted according to the user's usage conditions, so as to better balance the relationship between grayscale loss and refresh speed in combination with usage requirements. FIG. 4 is a schematic flowchart showing further screen driving method for an ink screen reading device according to an embodiment of the present disclosure. The method is applicable to an ink screen reading device. As shown in FIG. 4, the method adjusts the second temperature value according to a handwritten speed value and includes the steps in the following.

Step 400, presetting a first mapping table between a handwritten speed value and the second temperature value The handwritten speed value is positively correlated with the second temperature value. That is, the higher the handwritten speed value, the faster the refresh speed. For the setting of the second temperature value in the first mapping table, under the premise that it is not lower than the first temperature value, as the handwritten speed value increases, it can increase cumulatively in steps of 1 degree or 2 degrees.

Step 401, acquiring a current temperature value of a screen

Step 402, judging whether the current temperature value is less than a preset first temperature value, if yes, performing Step 403a, otherwise, performing Step 404

Step 403a, in condition that a stylus in contact with the screen, acquiring the handwritten speed value in each time frame in real time In the process of sliding the line, the tip of the stylus does not leave the ink screen. Thus, in condition that stylus in contact with the screen, the handwritten speed value in each time frame is acquired via a system interface in real time.

Step 403b, querying the second temperature value in the first mapping table according to the handwritten speed value Step 403c, looking up a preset table according to the second temperature value and grayscale values of content to be displayed to obtain a waveform of the screen Step 404, looking up the table according to the current temperature value and the grayscale values of content to be displayed to obtain the waveform of the screen Step 405, driving the screen by the waveform to display the content to be displayed In the embodiments of the present disclosure, the second temperature value is determined according to the handwritten speed value. When the handwritten speed value is higher, the refresh speed is ensured to be faster, thereby better balancing the relationship between the grayscale loss and the refresh speed.

Figure 5:
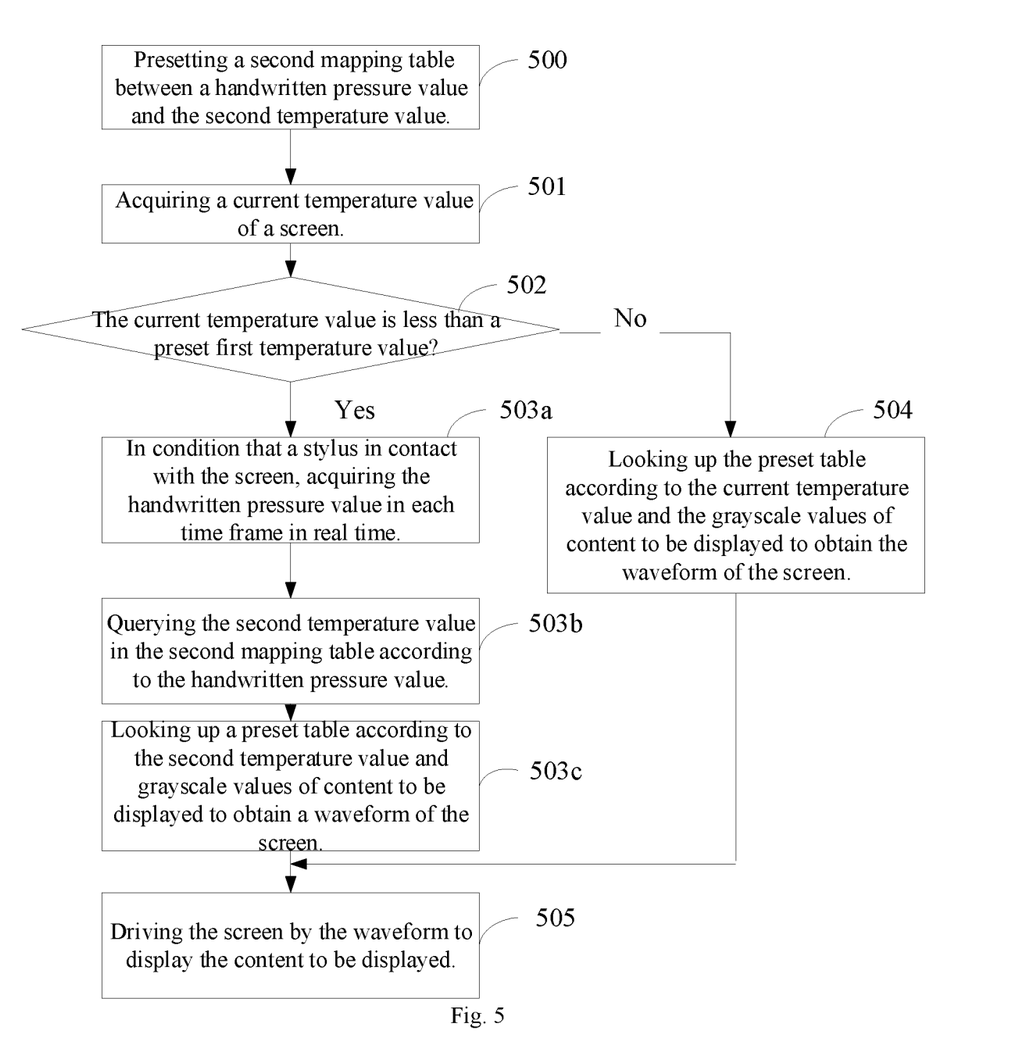
FIG. 5 is a schematic flowchart showing a screen driving method for an ink screen reading device according to further embodiment of the present disclosure.

In some embodiments, during the handwriting process, the second temperature value may also be dynamically adjusted according to the user's usage conditions, so as to better balance the relationship between grayscale loss and refresh speed in combination with usage requirements. FIG. 5 is a schematic flowchart showing further screen driving method for an ink screen reading device according to an embodiment of the present disclosure. The method is applicable to an ink screen reading device. As shown in FIG. 5, the method adjusts the second temperature value according to a handwritten pressure and includes the steps in the following.

Step 500, presetting a second mapping table between a handwritten pressure value and the second temperature value The handwritten pressure value is negatively correlated with the second temperature value. That is, the higher the handwritten pressure value, the better the grayscale display. For the setting of the second temperature value in the second mapping table, as the handwritten pressure value increases, it can decrease cumulatively in steps of 1 degree or 2 degrees.

Step 501, acquiring a current temperature value of a screen

Step 502, judging whether the current temperature value is less than a preset first temperature value, if yes, performing Step 503a, otherwise, performing Step 504

Step 503a, in condition that a stylus in contact with the screen, acquiring the handwritten pressure value in each time frame in real time In the process of sliding the line, the tip of the stylus does not leave the ink screen. Thus, in condition that the stylus in contact with the screen, the handwritten pressure value in each time frame is acquired via a system interface in real time. The handwritten pressure value may be a stroke pressure value that can be detected via a pressure sensor in the ink screen reading device.

Step 503b, querying the second temperature value in the second mapping table according to the handwritten pressure value Step 503c, looking up a preset table according to the second temperature value and grayscale values of content to be displayed to obtain a waveform of the screen Step 504, looking up the table according to the current temperature value and the grayscale values of content to be displayed to obtain the waveform of the screen Step 505, driving the screen by the waveform to display the content to be displayed In some embodiments, the second temperature value may be lower than the first temperature value, but if the second temperature value is lower than the actual temperature value, the actual temperature value is used to look up the preset table.

In the embodiments of the present disclosure, the second temperature value is determined according to the handwritten pressure value. When the handwritten pressure value is higher, the grayscale display is ensured to be better, thereby better balancing the relationship between the grayscale loss and the refresh speed.

Figure 6:
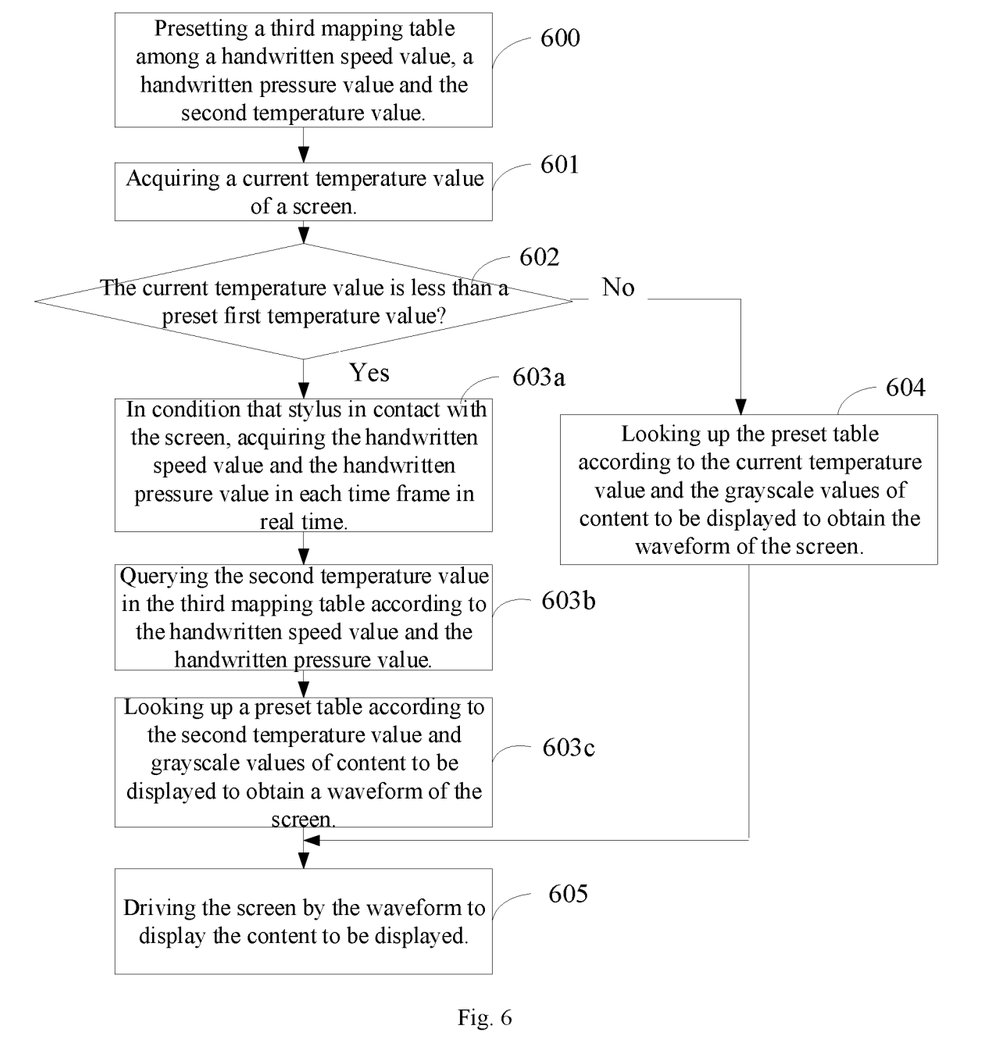
FIG. 6 is a schematic flowchart showing a screen driving method for an ink screen reading device according to further embodiment of the present disclosure.

In some embodiments, during the handwriting process, the second temperature value may also be dynamically adjusted according to the user's usage conditions, so as to better balance the relationship between grayscale loss and refresh speed in combination with usage requirements. FIG. 6 is a schematic flowchart showing further screen driving method for an ink screen reading device according to an embodiment of the present disclosure. The method is applicable to an ink screen reading device. As shown in FIG. 6, the method adjusts the second temperature value according to both the handwritten speed value and the handwritten pressure value and includes the steps in the following.

Step 600, presetting a third mapping table among a handwritten speed value, a handwritten pressure value and the second temperature value The handwritten speed value is positively correlated with the second temperature value. That is, the higher the handwritten speed value, the faster the refresh speed. For the setting of the second temperature value in the first mapping table, under the premise that it is not lower than the first temperature value, as the handwritten speed value increases, it can increase cumulatively in steps of 1 degree or 2 degrees. The handwritten pressure value is negatively correlated with the second temperature value. That is, the higher the handwritten pressure value, the better the grayscale display. For the setting of the second temperature value in the second mapping table, as the handwritten pressure value increases, it can decrease cumulatively in steps of 1 degree or 2 degrees.

Step 601, acquiring a current temperature value of a screen

Step 602, judging whether the current temperature value is less than a preset first temperature value, if yes, performing Step 603a, otherwise, performing Step 604

Step 603a, in condition that stylus in contact with the screen, acquiring the handwritten speed value and the handwritten pressure value in each time frame in real time In the process of sliding the line, the tip of the stylus does not leave the ink screen. Thus, in condition that stylus in contact with the screen, the handwritten speed value and the handwritten pressure value in each time frame is acquired via a system interface in real time.

Step 603b, querying the second temperature value in the third mapping table according to the handwritten speed value and the handwritten pressure value Step 603c, looking up a preset table according to the second temperature value and grayscale values of content to be displayed to obtain a waveform of the screen Step 604, looking up the table according to the current temperature value and the grayscale values of content to be displayed to obtain the waveform of the screen Step 605, driving the screen by the waveform to display the content to be displayed In some embodiments, the second temperature value may be lower than the first temperature value, but if the second temperature value is lower than the actual temperature value, the actual temperature value is used to look up the preset table.

In the embodiments of the present disclosure, the second temperature value is determined according to both the handwritten speed value and the handwritten pressure value. When the handwritten speed value is higher, the refresh speed is ensured to be faster, and when the handwritten pressure value is higher, the grayscale display is ensured to be better, thereby better balancing the relationship between the grayscale loss and the refresh speed.

Figure 7:
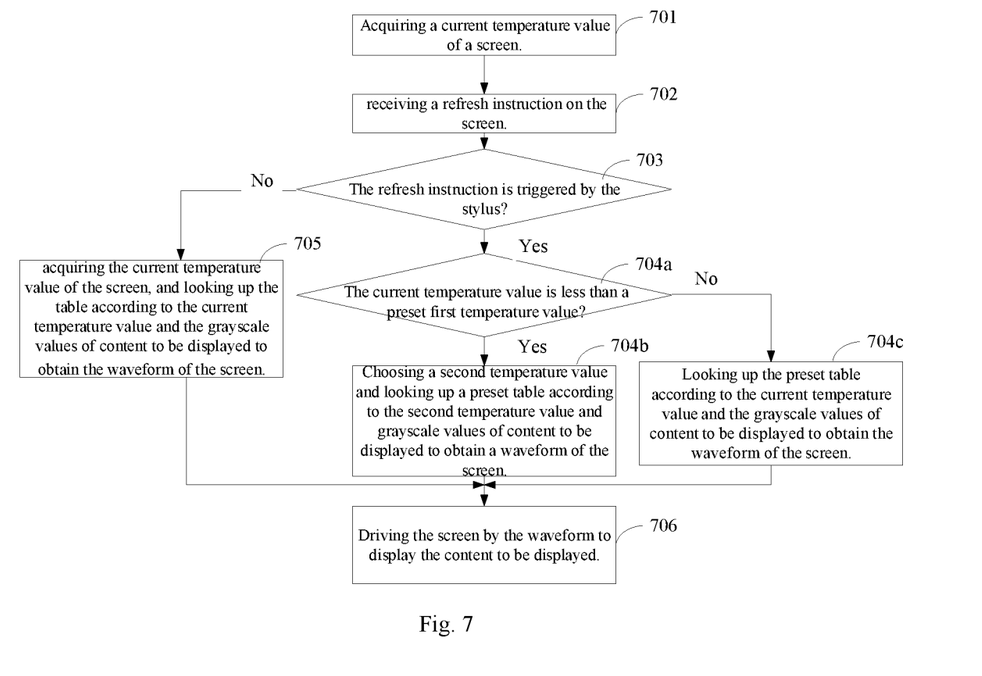
FIG. 7 is a schematic flowchart showing a screen driving method for an ink screen reading device according to further embodiment of the present disclosure.

The refresh scenarios involved in the embodiments of the present disclosure include: general page content refresh, for example, page turning, switching to a setting interface, etc.; and refresh in a handwriting scenario. In the latter scenario, the ink screen reading device receives any content that the user writes on the ink screen with the electromagnetic pen. As the pen tip moves on the ink screen, the ink screen reading device needs to refresh frequently to dynamically display the continuous changes of the handwritten lines. Therefore, the handwriting scene is more sensitive to the refresh speed of ink screen. FIG. 7 is a schematic flowchart showing further screen driving method for an ink screen reading device according to another embodiment of the present disclosure. The method is applicable to an ink screen reading device. As shown in FIG. 7, the method includes the steps in the following.

Step 701, acquiring a current temperature value of a screen

Step 702, receiving a refresh instruction on the screen

Step 703, judging whether the refresh instruction is triggered by the stylus, if yes, performing Step 704a, otherwise, performing Step 705

The ink screen reading device has a built-in electromagnetic handwriting board for use with an electromagnetic pen (stylus pen). When a stylus pen is used to write handwriting on the screen, the distance between the tip of the stylus pen and the electromagnetic handwriting board is close enough so that the electromagnetic handwriting board can detect an electromagnetic signal generated by the LC oscillating circuit and transmit relevant information of the electromagnetic signal to the operating system. The relevant information includes the signal type (for example, the electromagnetic signal), the strength of the signal, and the coordinate position of the signal on the screen. In addition, the ink screen reading device also provides a touch function. A capacitive touch pad is set additionally between the ink screen and the electromagnetic handwriting board. When the user's finger touches the screen, a capacitive signal triggered by an infrared ray of the finger can be detected. Then relevant information of the capacitance signal is transferred to the operating system. The relevant information includes signal type (such as capacitive signal), touch type (such as click, long press, slide, etc.), and the coordinate position of the signal on the screen.

When the screen generates an operation instruction, the operating system will transmit the relevant information of the operation instruction to the processor of the reading device, and the processor can determine whether the refresh instruction is triggered by the stylus or finger according to the signal type in the relevant information.

Step 704a, judging whether the current temperature value is less than a preset first temperature value, if yes, performing Step 704b, otherwise, performing Step 704c Step 704b, choosing a second temperature value and looking up a preset table according to the second temperature value and grayscale values of content to be displayed to obtain a waveform of the screen The second temperature value is a preset value and greater than or equal to the first temperature value. The preset table may be the LUT. The preset table is the correspondence table of temperatures, grayscale values and driving waveforms.

Step 704c, looking up the table according to the current temperature value and the grayscale values of content to be displayed to obtain the waveform of the screen Step 705, acquiring the current temperature value of the screen, and looking up the table according to the current temperature value and the grayscale values of content to be displayed to obtain the waveform of the screen Step 706, driving the screen by the waveform to display the content to be displayed It is understandable that the foregoing steps 704a-704c are the same as the steps 102-104 of the foregoing embodiment, and the specific implementation process can refer to the foregoing embodiment, which will not be repeated here. Of course, the above steps 704a-704c can also be replaced with steps 202-204 in the previous embodiment, or added by steps 301-303, or replaced with steps 402-404, 502-504 or 602-604 in the previous embodiment, which will not describe in detail.

In this embodiment, a judging step is added to determine whether the refresh instruction is triggered by a stylus. If the refresh instruction is triggered by a stylus, for example, triggered by an electromagnetic signal, the ink screen driving process of the foregoing embodiment is performed. If the refresh instruction is triggered by clicking on the control via a finger or page turning etc., for example triggered by a capacitance signal, the current actual temperature is used to look up the preset table.

The embodiments of the preset disclosure also provide a non-volatile computer readable storage medium storing at least one executable instruction, wherein the executable instruction is configured to cause a processor to perform the following operations:

acquiring a current temperature value of a screen;

judging whether the current temperature value is lower than a preset first temperature value;

in condition that the current temperature value is lower than the first temperature value, choosing a second temperature value and looking up a preset table according to the second temperature value and grayscale values of content to be displayed to obtain a waveform of the screen, wherein the second temperature value is higher than or equal to the first temperature value;

in condition that the current temperature value is higher than or equal to the first temperature value, looking up the table according to the current temperature value and the grayscale values of content to be displayed to obtain the waveform of the screen; and driving the screen by the waveform to display the content to be displayed.

In an alternative manner, the executable instruction is configured to cause a processor to perform the following operations:

creating a correspondence between grayscale values and temperature values in the table according to the waveform, wherein the choosing a second temperature value further comprises:

presetting an initial temperature value higher than or equal to the first temperature value;

acquiring an actual grayscale value of each pixel in the content to be displayed and adjusting the actual grayscale value to a correction grayscale value based on a preset correction rule, wherein the correction grayscale value is less than the actual grayscale value;

querying the table to obtain a temperature value corresponding to the correction grayscale value as a correction temperature value;

judging whether the correction temperature value is greater than the initial temperature value;

in condition that the correction temperature value is greater than the initial temperature value, determining the initial temperature value as the second temperature value; and in condition that the correction temperature value is less than or equal to the initial temperature value, determining the correction temperature value as the second temperature value.

In an alternative manner, adjusting the actual grayscale value to a correction grayscale value based on a preset correction rule further comprises:

adjusting the actual grayscale value to the correction grayscale value based on a grayscale loss ratio; or reducing a grayscale of the content to be displayed by N grayscales to obtain the correction grayscale value, where N is a natural number.

In an alternative manner, in a handwriting scenario, the executable instruction is configured to cause a processor to perform the following operations: setting the grayscale loss ratio to be inversely proportional to thickness of a stylus line.

In an alternative manner, the executable instruction is configured to cause a processor to perform the following operations:

saving data parameters of pixels in a handwriting during a handwritten operation, wherein the data parameters include pixel coordinates and standard grayscale values of the pixels;

in condition that the handwritten operation of the current page is completed, clearing display content of a current page on the screen;

querying the waveform of the screen in the table according to the pixel coordinates, the standard grayscale values of the pixels and the current temperature value; and driving the screen by the waveform to display the content that is cleared, so that a global refreshment is completed.

In an alternative manner, the saving content data parameters of pixels in a handwriting further comprises:

in condition that there is an overlap between handwritten lines, superimposing the grayscale values of each handwritten line corresponding to a pixel of an overlap as the standard grayscale value of the pixel.

In an alternative manner, the executable instruction is configured to cause a processor to perform the following operations: presetting a first mapping table between a handwritten speed value and the second temperature value, wherein the handwritten speed value is positively correlated with the second temperature value; the choosing a second temperature value further comprises:

in condition that a stylus in contact with the screen, acquiring the handwritten speed value in each time frame in real time, and querying the second temperature value in the first mapping table according to the handwritten speed value;

or the operations further comprising: presetting a second mapping table between a handwritten pressure value and the second temperature value, wherein the handwritten pressure value is negatively correlated with the second temperature value; the choosing a second temperature value further comprises:

in condition that the stylus in contact with the screen, acquiring the handwritten pressure value in each time frame in real time, and querying the second temperature value in the second mapping table according to the handwritten pressure value.

In an alternative manner, the executable instruction is configured to cause a processor to perform the following operations:

receiving a refresh instruction on the screen;

judging whether the refresh instruction is triggered by a stylus;

in condition that the refresh instruction is triggered by the stylus, acquiring a current temperature value of a screen, judging whether the current temperature value is lower than a preset first temperature value, in condition that the current temperature value is lower than the first temperature value, choosing a second temperature value and looking up a preset table according to the second temperature value and grayscale values of content to be displayed to obtain a waveform of the screen, wherein the second temperature value is higher than or equal to the first temperature value, in condition that the current temperature value is higher than or equal to the first temperature value, looking up the table according to the current temperature value and the grayscale values of content to be displayed to obtain the waveform of the screen, and driving the screen by the waveform to display the content to be displayed; and in condition that the refresh instruction is not triggered by the stylus, looking up the table according to the current temperature value and the grayscale values of content to be displayed to obtain the waveform of the screen, and driving the screen by the waveform to display the content to be displayed.

Figure 8:
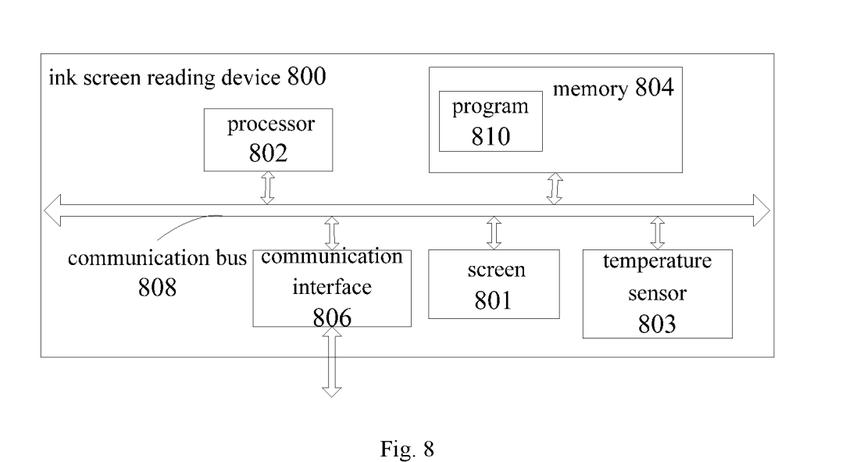
FIG. 8 is a schematic diagram showing the structure of an ink screen reading device provided by an embodiment of the present disclosure.

FIG. 8 is a schematic diagram showing the structure of an ink screen reading device provided by an embodiment of the present disclosure. As shown in FIG. 8, the ink screen reading device 800 comprises an ink screen 801, a temperature sensor 803, at least one processor 802, a memory 804, a communication interface 806 and a communication bus 808.

The ink screen 801, the temperature sensor 803, the processor 802, the memory 804, and the communication interface 806 communicate with each other through the communication bus 806. The temperature sensor 803 is configured to acquire the current temperature of the ink screen. The communication interface 806 is configured to communicate with other devices, such as network elements such as clients or other servers. The processor 802 is configured to execute the program 810, and specifically execute the relevant steps in the embodiments of the screen driving method for the ink screen reading device.

Specifically, the program 810 may include program codes, and the program codes include a computer operation instruction.

The processor 802 may be a central processing unit CPU, or an Application Specific Integrated Circuit (ASIC), or one or more integrated circuits configured to implement the embodiments of the present disclosure. The ink screen reading device includes one or more processors, which may be the same type of processor, such as one or more CPUs, or may be different types of processors, such as one or more CPUs and one or more ASICs.

The memory 804 is configured to store the program 810. The memory 804 may include a high-speed RAM memory, and may also include a non-volatile memory (non-volatile memory), for example, at least one magnetic disk memory.

The program 810 may be configured to cause a processor to perform the following operations:

acquiring a current temperature value of a screen;

judging whether the current temperature value is lower than a preset first temperature value;

in condition that the current temperature value is lower than the first temperature value, choosing a second temperature value and looking up a preset table according to the second temperature value and grayscale values of content to be displayed to obtain a waveform of the screen, wherein the second temperature value is higher than or equal to the first temperature value;

in condition that the current temperature value is higher than or equal to the first temperature value, looking up the table according to the current temperature value and the grayscale values of content to be displayed to obtain the waveform of the screen; and driving the screen by the waveform to display the content to be displayed.

In an alternative manner, the program is configured to cause a processor 802 to perform the following operations:

creating a correspondence between grayscale values and temperature values in the table according to the waveform, wherein the choosing a second temperature value further comprises:

presetting an initial temperature value higher than or equal to the first temperature value;

acquiring an actual grayscale value of each pixel in the content to be displayed and adjusting the actual grayscale value to a correction grayscale value based on a preset correction rule, wherein the correction grayscale value is less than the actual grayscale value;

querying the table to obtain a temperature value corresponding to the correction grayscale value as a correction temperature value;

judging whether the correction temperature value is greater than the initial temperature value;

in condition that the correction temperature value is greater than the initial temperature value, determining the initial temperature value as the second temperature value; and in condition that the correction temperature value is less than or equal to the initial temperature value, determining the correction temperature value as the second temperature value.

In an alternative manner, the adjusting the actual grayscale value to a correction grayscale value based on a preset correction rule further comprises:

adjusting the actual grayscale value to the correction grayscale value based on a grayscale loss ratio; or reducing a grayscale of the content to be displayed by N grayscales to obtain the correction grayscale value, where N is a natural number.

In an alternative manner, in a handwriting scenario, the program is configured to cause a processor 802 to perform the following operations: setting the grayscale loss ratio to be inversely proportional to thickness of a stylus line.

In an alternative manner, the program is configured to cause a processor 802 to perform the following operations:

saving data parameters of pixels in a handwriting during a handwritten operation, wherein the data parameters include pixel coordinates and standard grayscale values of the pixels;

in condition that the handwritten operation of the current page is completed, clearing display content of a current page on the screen;

querying the waveform of the screen in the table according to the pixel coordinates, the standard grayscale values of the pixels and the current temperature value; and driving the screen by the waveform to display the content that is cleared, so that a global refreshment is completed.

In an alternative manner, the saving content data parameters of pixels in a handwriting further comprises:

in condition that there is an overlap between handwritten lines, superimposing the grayscale values of each handwritten line corresponding to a pixel of an overlap as the standard grayscale value of the pixel.

In an alternative manner, the program is configured to cause a processor 802 to perform the following operations: presetting a first mapping table between a handwritten speed value and the second temperature value, wherein the handwritten speed value is positively correlated with the second temperature value; the choosing a second temperature value further comprises:

in condition that a stylus in contact with the screen, acquiring the handwritten speed value in each time frame in real time, and querying the second temperature value in the first mapping table according to the handwritten speed value;

or the operations further comprising: presetting a second mapping table between a handwritten pressure value and the second temperature value, wherein the handwritten pressure value is negatively correlated with the second temperature value; the choosing a second temperature value further comprises:

in condition that the stylus in contact with the screen, acquiring the handwritten pressure value in each time frame in real time, and querying the second temperature value in the second mapping table according to the handwritten pressure value.

In an alternative manner, the program is configured to cause a processor 802 to perform the following operations:

receiving a refresh instruction on the screen;

judging whether the refresh instruction is triggered by a stylus;

in condition that the refresh instruction is triggered by the stylus, acquiring a current temperature value of a screen, judging whether the current temperature value is lower than a preset first temperature value, in condition that the current temperature value is lower than the first temperature value, choosing a second temperature value and looking up a preset table according to the second temperature value and grayscale values of content to be displayed to obtain a waveform of the screen, wherein the second temperature value is higher than or equal to the first temperature value, in condition that the current temperature value is higher than or equal to the first temperature value, looking up the table according to the current temperature value and the grayscale values of content to be displayed to obtain the waveform of the screen, and driving the screen by the waveform to display the content to be displayed; and in condition that the refresh instruction is not triggered by the stylus, looking up the table according to the current temperature value and the grayscale values of content to be displayed to obtain the waveform of the screen, and driving the screen by the waveform to display the content to be displayed.

The algorithms and displays provided here are not inherently related to any particular computer, virtual system or other equipment. Various general-purpose systems can also be used with the teaching based on this. Based on the above description, the structure required to construct this type of system is obvious. In addition, the present disclosure is not directed to any specific programming language. It should be understood that various programming languages can be used to implement the content of the present disclosure described herein, and the above description of a specific language is for the purpose of disclosing the best embodiment of the present disclosure.

In the instructions provided here, a lot of specific details are explained. However, it can be understood that the embodiments of the present disclosure may be practiced without these specific details. In some instances, well-known methods, structures, and technologies are not shown in detail, so as not to obscure the understanding of this specification.

Similarly, it should be understood that in order to simplify the present disclosure and help understand one or more of the various disclosed aspects, in the above description of the exemplary embodiments of the present disclosure, the various features of the present disclosure are sometimes grouped together into a single embodiment, figure, or its description. However, the disclosed method should not be interpreted as reflecting the intention that the claimed disclosure requires more features than those explicitly recorded in each claim. More precisely, as reflected in the following claims, the disclosure aspect lies in less than all the features of a single embodiment previously disclosed. Therefore, the claims following the specific embodiment are thus explicitly incorporated into the specific embodiment, wherein each claim itself serves as a separate embodiment of the present disclosure.

Those skilled in the art can understand that it is possible to adaptively change the modules in the device in the embodiment and set them in one or more devices different from the embodiment. The modules or units or components in the embodiments can be combined into one module or unit or component, and in addition, they can be divided into multiple sub-modules or sub-units or sub-components. Except that at least some of such features or processes or units are mutually exclusive, any combination can be used to compare all the features disclosed in this specification (including the accompanying claims, abstract and drawings) and any method or device thus disclosed. All processes or units are combined. Unless expressly stated otherwise, each feature disclosed in this specification (including the accompanying claims, abstract and drawings) may be replaced by an alternative feature providing the same, equivalent or similar purpose.

In addition, those skilled in the art can understand that although some embodiments herein include certain features included in other embodiments but not other features, the combination of features of different embodiments means that they are within the scope of the present disclosure and form different embodiments. For example, in the following claims, any one of the claimed embodiments can be used in any combination.

It should be noted that the above-mentioned embodiments illustrate rather than limit the present disclosure, and those skilled in the art can design alternative embodiments without departing from the scope of the appended claims. In the claims, any reference numbers placed between parentheses should not be constructed as a limitation to the claims. The word "comprising" does not exclude the presence of elements or steps not listed in the claims. The word "a" or "an" preceding an element does not exclude the presence of multiple such elements. The present disclosure can be realized by means of hardware including several different elements and by means of a suitably programmed computer. In the unit claims enumerating several devices, several of these devices may be embodied in the same hardware item. The use of the words first, second, and third, etc. do not indicate any order. These words can be interpreted as names.

What is claimed is:

1. A screen driving method for an ink screen reading device, comprising:

acquiring a current temperature value of a screen;

in condition that the current temperature value is lower than a preset first temperature value, choosing a second temperature value and looking up a preset table according to the second temperature value and grayscale values of content to be displayed to obtain a waveform of the screen, wherein the second temperature value is higher than or equal to the preset first temperature value;

in condition that the current temperature value is higher than or equal to the preset first temperature value, looking up the preset table according to the current temperature value and the grayscale values of content to be displayed to obtain the waveform of the screen;

driving the screen by the waveform to display the content to be displayed;

wherein the screen driving method further comprises:

saving data parameters of pixels in a handwriting during a handwritten operation, wherein the data parameters include pixel coordinates and standard grayscale values of the pixels;

in condition that the handwritten operation of the current page is completed, clearing display content of a current page on the screen;

querying the waveform of the screen in the preset table according to the pixel coordinates, the standard grayscale values of the pixels and the current temperature value; and driving the screen by the waveform to display the content that is cleared so that a global refreshment is completed.

2. The screen driving method according to claim 1, further comprising:

creating a correspondence between grayscale values and temperature values in the preset table according to the waveform, wherein the choosing a second temperature value— further comprises:

presetting an initial temperature value higher than or equal to the preset first temperature value;

acquiring an actual grayscale value of each pixel in the content to be displayed and adjusting the actual grayscale value to a correction grayscale value based on a preset correction rule, wherein the correction grayscale value is less than the actual grayscale value;

querying the preset table to obtain a temperature value corresponding to the correction grayscale value as a correction temperature value;

in condition that the correction temperature value is greater than the initial temperature value, determining the initial temperature value as the second temperature value; and in condition that the correction temperature value is less than or equal to the initial temperature value, determining the correction temperature value as the second temperature value.

3. The screen driving method according to claim 2, wherein the adjusting the actual grayscale value to a correction grayscale value based on a preset correction rule further comprises:

adjusting the actual grayscale value to the correction grayscale value based on a grayscale loss ratio; or reducing a grayscale of the content to be displayed by N grayscales to obtain the correction grayscale value, where N is a natural number.

4. The screen driving method according to claim 3, wherein in a handwriting scenario, the grayscale loss ratio is set to be inversely proportional to thickness of a stylus line.

5. The screen driving method according to claim 1, wherein the saving data parameters of pixels in a handwriting further comprises:

in condition that there is an overlap between handwritten lines, superimposing the grayscale values of each handwritten line corresponding to a pixel of an overlap as the standard grayscale value of the pixel.

6. The screen driving method according to claim 1, further comprising:

presetting a first mapping table between a handwritten speed value and the second temperature value, wherein the handwritten speed value is positively correlated with the second temperature value; the choosing a second temperature value further comprises:

in condition that a stylus in contact with the screen, acquiring the handwritten speed value in each time frame in real time, and querying the second temperature value in the first mapping table according to the handwritten speed value;

or the screen driving method further comprising: presetting a second mapping table between a handwritten pressure value and the second temperature value, wherein the handwritten pressure value is negatively correlated with the second temperature value; the choosing a second temperature value—further comprises:

in condition that the stylus in contact with the screen, acquiring the handwritten pressure value in each time frame in real time, and querying the second temperature value in the second mapping table according to the handwritten pressure value.

7. The screen driving method according to claim 1, further comprising:

receiving a refresh instruction on the screen;

in condition that the refresh instruction is triggered by the stylus, performing all the steps of the claim 1; and in condition that the refresh instruction is not triggered by the stylus, looking up the preset table according to the current temperature value and the grayscale values of content to be displayed to obtain the waveform of the screen, and driving the screen by the waveform to display the content to be displayed.

8. An ink screen reading device, comprising a screen, a temperature sensor, at least one processor, a memory, a communication interface and a communication bus, wherein the screen, the temperature sensor, the processor, the memory, and the communication interface communicate with each other through the communication bus;

the memory is configured to store executable instructions that upon execution cause the at least one processor to perform operations, the operations comprising:

acquiring a current temperature value of the screen via the temperature sensor;

in condition that the current temperature value is lower than a preset first temperature value, choosing a second temperature value and looking up a preset table according to the second temperature value and grayscale values of content to be displayed to obtain a waveform of the screen, wherein the second temperature value is higher than or equal to the preset first temperature value;

in condition that the current temperature value is higher than or equal to the preset first temperature value, looking up the preset table according to the current temperature value and the grayscale values of content to be displayed to obtain the waveform of the screen;

driving the screen by the waveform to display the content to be displayed;

wherein the operations further comprise:

saving data parameters of pixels in a handwriting during a handwritten operation, wherein the data parameters include pixel coordinates and standard grayscale values of the pixels;

in condition that the handwritten operation of the current page is completed, clearing display content of a current page on the screen;

querying the waveform of the screen in the preset table according to the pixel coordinates, the standard grayscale values of the pixels and the current temperature value; and driving the screen by the waveform to display the content that is cleared so that a global refreshment is completed.

9. The ink screen driving device according to claim 8, wherein the operations further comprise: creating a correspondence between grayscale values and temperature values in the preset table according to the waveform, wherein the choosing a second temperature value further comprises:

presetting an initial temperature value higher than or equal to the preset first temperature value;

acquiring an actual grayscale value of each pixel in the content to be displayed and adjusting the actual grayscale value to a correction grayscale value based on a preset correction rule, wherein the correction grayscale value is less than the actual grayscale value;

querying the preset table to obtain a temperature value corresponding to the correction grayscale value as a correction temperature value;

in condition that the correction temperature value is greater than the initial temperature value, determining the initial temperature value as the second temperature value; and in condition that the correction temperature value is less than or equal to the initial temperature value, determining the correction temperature value as the second temperature value.

10. The ink screen driving device according to claim 9, wherein the adjusting the actual grayscale value to a correction grayscale value based on a preset correction rule further comprises:
adjusting the actual grayscale value to the correction grayscale value based on a grayscale loss ratio; or
reducing a grayscale of the content to be displayed by N grayscales to obtain the correction grayscale value, where N is a natural number.

11. The ink screen driving device according to claim 10, wherein in a handwriting scenario, the grayscale loss ratio is set to be inversely proportional to thickness of a stylus line.

12. The ink screen driving device according to claim 8, wherein the saving data parameters of pixels in a handwriting further comprises:
in condition that there is an overlap between handwritten lines, superimposing the grayscale values of each handwritten line corresponding to a pixel of an overlap as the standard grayscale value of the pixel.

13. The ink screen driving device according to claim 8, wherein the operations further comprise: presetting a first mapping table between a handwritten speed value and the second temperature value, wherein the handwritten speed value is positively correlated with the second temperature value; the choosing a second temperature value further comprises:
in condition that a stylus in contact with the screen, acquiring the handwritten speed value in each time frame in real time, and querying the second temperature value in the first mapping table according to the handwritten speed value;
or
the operations further comprising: presetting a second mapping table between a handwritten pressure value and the second temperature value, wherein the handwritten pressure value is negatively correlated with the second temperature value; the choosing a second temperature value further comprises:
in condition that the stylus in contact with the screen, acquiring the handwritten pressure value in each time frame in real time, and querying the second temperature value in the second mapping table according to the handwritten pressure value.

14. The ink screen driving device according to claim 8, wherein the operations further comprise:
receiving a refresh instruction on the screen;
in condition that the refresh instruction is triggered by the stylus, performing all the operations of the claim 8; and
in condition that the refresh instruction is not triggered by the stylus, looking up the preset table according to the current temperature value and the grayscale values of content to be displayed to obtain the waveform of the screen, and driving the screen by the waveform to display the content to be displayed.

15. A non-volatile computer readable storage medium storing at least one executable instruction, wherein the executable instruction is configured to cause a processor to perform operations of:
acquiring a current temperature value of a screen;
in condition that the current temperature value is lower than a preset first temperature value, choosing a second temperature value and looking up a preset table according to the second temperature value and grayscale values of content to be displayed to obtain a waveform of the screen, wherein the second temperature value is higher than or equal to the preset first temperature value;
in condition that the current temperature value is higher than or equal to the preset first temperature value, looking up the preset table according to the current temperature value and the grayscale values of content to be displayed to obtain the waveform of the screen;
driving the screen by the waveform to display the content to be displayed;
wherein the operations further comprise:
saving data parameters of pixels in a handwriting during a handwritten operation, wherein the data parameters include pixel coordinates and standard grayscale values of the pixels;
in condition that the handwritten operation of the current page is completed, clearing display content of a current page on the screen;
querying the waveform of the screen in the preset table according to the pixel coordinates, the standard grayscale values of the pixels and the current temperature value; and
driving the screen by the waveform to display the content that is cleared so that a global refreshment is completed.

16. The non-volatile computer readable storage medium according to claim 15, wherein the executable instruction is configured to further cause the processor to perform operations of:
creating a correspondence between grayscale values and temperature values in the preset table according to the waveform,
wherein the choosing a second temperature value further comprises:
presetting an initial temperature value higher than or equal to the preset first temperature value;
acquiring an actual grayscale value of each pixel in the content to be displayed and adjusting the actual grayscale value to a correction grayscale value based on a preset correction rule, wherein the correction grayscale value is less than the actual grayscale value;
querying the preset table to obtain a temperature value corresponding to the correction grayscale value as a correction temperature value;
in condition that the correction temperature value is greater than the initial temperature value, determining the initial temperature value as the second temperature value; and
in condition that the correction temperature value is less than or equal to the initial temperature value, determining the correction temperature value as the second temperature value.

17. The-non-volatile computer readable storage medium according to claim 16, wherein the adjusting the actual grayscale value to a correction grayscale value based on a preset correction rule further comprises:
adjusting the actual grayscale value to the correction grayscale value based on a grayscale loss ratio; or
reducing a grayscale of the content to be displayed by N grayscales to obtain the correction grayscale value, where N is a natural number.

18. The non-volatile computer readable storage medium according to claim 17, wherein in a handwriting scenario, the grayscale loss ratio is set to be inversely proportional to thickness of a stylus line.

* * * * *